(12) United States Patent
Jang et al.

(10) Patent No.: US 7,544,022 B2
(45) Date of Patent: Jun. 9, 2009

(54) MILLING CUTTER

(75) Inventors: Byeong Han Jang, Cheongju (KR); Kee Hun Kim, Seoul (KR); Dong Ryoung Ji, Cheongju (KR); Moon Sung Cho, Seoul (KR); Hak Kyu Kim, Cheongju (KR)

(73) Assignee: Korloy Inc., Cheugju (KR)

( * ) Notice: Subject to any disclaimer, the term of this patent is extended or adjusted under 35 U.S.C. 154(b) by 0 days.

(21) Appl. No.: 10/539,599

(22) PCT Filed: Dec. 1, 2004

(86) PCT No.: PCT/KR2004/003135

§ 371 (c)(1),
(2), (4) Date: Nov. 8, 2006

(87) PCT Pub. No.: WO2005/077580

PCT Pub. Date: Aug. 25, 2005

(65) Prior Publication Data

US 2007/0041797 A1    Feb. 22, 2007

(30) Foreign Application Priority Data

Feb. 16, 2004  (KR) ............... 10-2004-0010094
Nov. 24, 2004  (KR) ............... 10-2004-0096727

(51) Int. Cl.
  *B23B 27/16*    (2006.01)
  *B23C 5/00*    (2006.01)
(52) U.S. Cl. ............... 407/66; 407/67; 407/113
(58) Field of Classification Search ............... 407/40, 407/46, 67
See application file for complete search history.

(56) References Cited

U.S. PATENT DOCUMENTS

| 5,388,932 | A | | 2/1995 | DeRoche et al. | |
|---|---|---|---|---|---|
| 5,395,186 | A | * | 3/1995 | Qvart | 407/46 |
| 5,800,079 | A | * | 9/1998 | Qvarth | 407/46 |
| 6,203,251 | B1 | * | 3/2001 | Oppelt et al. | 407/48 |
| 6,579,042 | B1 | * | 6/2003 | Shiraiwa | 407/35 |
| 7,101,121 | B2 | * | 9/2006 | Wermeister et al. | 407/113 |
| 7,118,311 | B2 | * | 10/2006 | Astrom | 407/46 |
| 2003/0103818 | A1 | * | 6/2003 | Astrom | 407/41 |

FOREIGN PATENT DOCUMENTS

| JP | 8-71832 A | 3/1996 |
|---|---|---|
| JP | 10-315030 A | 12/1998 |
| JP | 2000-158225 A | 6/2000 |
| JP | 2001-239419 A | 9/2001 |

* cited by examiner

*Primary Examiner*—Willmon Fridie
(74) *Attorney, Agent, or Firm*—Birch, Stewart, Kolasch & Birch, LLP

(57) ABSTRACT

The object of this invention is to provide a milling cutter which includes a cutting insert (120), which has a hexahedral shape and is provided with first and second cutting blade parts on opposite ends thereof, and a cutter body (110) provided with a plurality of insert seats (112) which the cutting insert (120) is seated in and fastened to in either of two directions. The cutting insert (120) is fastened to the associated insert seat (112) in a selected direction, thus all corner blades or main blades, provided on the first and second cutting blade parts of the cutting insert, can be used for machining workpieces. Therefore, the present invention extends the lifetime of the cutting insert (120).

11 Claims, 3 Drawing Sheets

MILLING CUTTER

TECHNICAL FIELD

The present invention relates, in general, to milling cutters and, more particularly, to a milling cutter which includes a cutting insert, which has a cubic or rectangular parallelepiped shape and is provided with first and second cutting blade parts on opposite ends thereof, and a cutter body provided with a plurality of insert seats which the cutting insert is seated in and fastened to in either of two directions, so that the cutting insert may be fastened to the associated insert seat in either direction, thus all corner blades or main blades, provided on the first and second cutting blade parts of the cutting insert, can be used for machining workpieces, thereby extending the lifetime of the cutting insert.

BACKGROUND ART

Generally, cutting tools are used for machining various kinds of workpieces. Such a cutting tool is mounted to a machine tool and conducts a cutting operation to form a workpiece into a desired shape.

Typically, a cutting tool includes a cutting insert having a cutting blade, which substantially conducts a cutting operation, and a cutter body which supports the cutting insert.

There are two methods to cut a metal workpiece using a cutting tool. In a first method, a fixed cutting tool cuts a workpiece, which rotates. In a second method, a tool, which has a cutting blade and rotates, cuts a fixed workpiece.

Milling conforms to the second of the above-mentioned cutting methods. Plane machining, side machining, groove machining, hole machining, etc. can be carried out by a milling cutter.

Many efforts have been conducted to reduce resistance during the machining process of a milling cutter, to extend the lifetime of a tool, and to enhance the machining quality.

However, in conventional cutting inserts, even if a cutting blade part is provided on each of opposite ends of a cutting insert, because the cutting insert is mounted to a cutter body in only one direction, only part of the corner blades or main blades of the cutting blade parts is used for cutting workpieces. Therefore, there is a problem in that the lifetime of the cutting insert is reduced.

DISCLOSURE OF THE INVENTION

Accordingly, the present invention has been made keeping in mind the above problems occurring in the prior art, and an object of the present invention is to provide a milling cutter which includes a cutting insert, which has a cubic or rectangular parallelepiped shape and is provided with first and second cutting blade parts on opposite ends thereof, and a cutter body provided with a plurality of insert seats which the cutting insert is seated in and fastened to in either of two directions, so that the cutting insert may be fastened to the associated insert seat in either direction, thus all corner blades or main blades, provided -on the first and second cutting blade parts of the cutting insert, can be used for machining workpieces, thereby extending the lifetime of the cutting insert.

BEST MODE FOR CARRYING OUT THE INVENTION

The present invention provides a milling cutter, including: a cutter body provided with a plurality of insert seats; and a cutting insert, having a hexahedral shape, inserted into and fastened to each of the insert seats in either of two directions.

Furthermore, the cutting insert has: a through hole formed in the cutting insert from an upper surface to a lower surface of the cutting insert; and first and second cutting blade parts having the same shape and provided on first and second ends of the cutting insert, respectively.

In addition, the insert seats are radially formed inwards around a circumferential outer surface of the cutter body and are spaced apart from each other at regular intervals, and each of the insert seats comprises first and second locking holes respectively formed on first and second inner surfaces of the insert seat, so that the cutting insert is fastened to the insert seat by a locking screw which is tightened into the first or second locking hole of the insert seat after passing through the through hole of the cutting insert.

Each cutting insert has a cubic or rectangular parallelepiped shape.

As such, the milling cutter of the present invention includes a cutting insert, which has a cubic or rectangular parallelepiped shape and is provided with first and second cutting blade parts on opposite ends thereof, and a cutter body provided with a plurality of insert seats which the cutting insert is seated in and fastened to in either of two directions. Therefore, the cutting insert may be fastened to the associated insert seat in either direction, thus all corner blades or main blades, provided on the first and second cutting blade parts of the cutting insert, are used for machining workpieces. Thereby, the lifetime of the cutting insert is extended.

Hereinafter, a milling cutter according to a preferred embodiment of the present invention will be described in detail with reference to the attached drawings.

Figure 1:
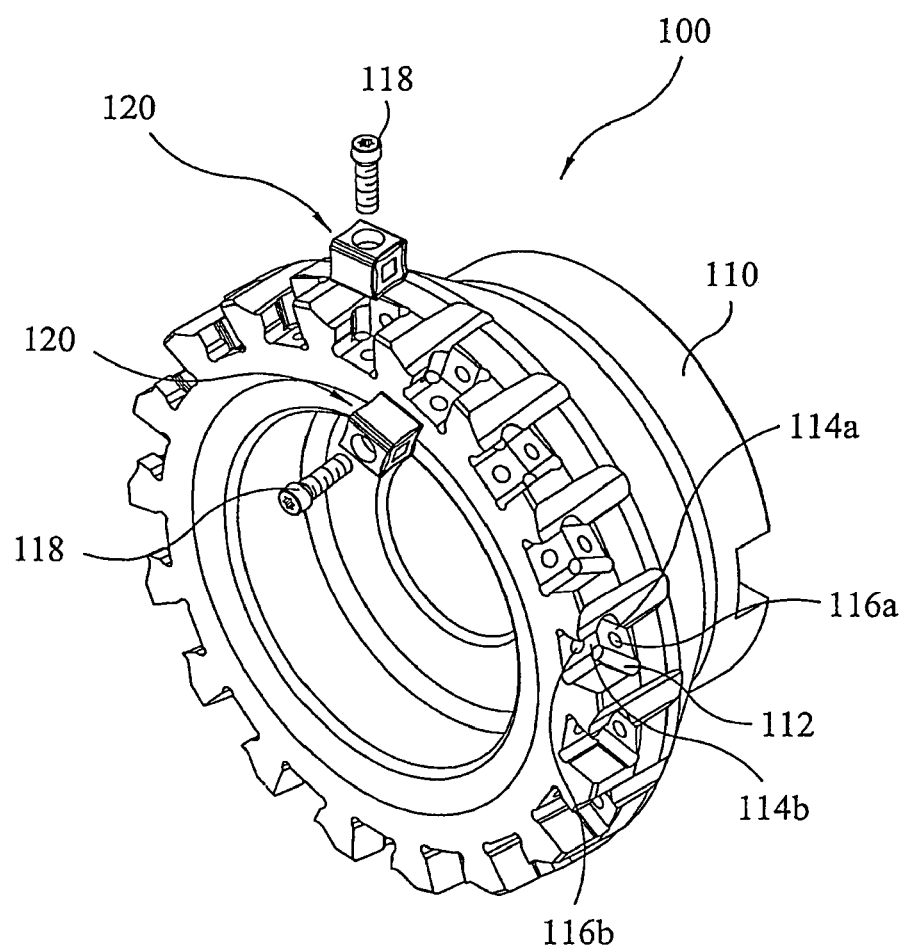
FIG. 1 is an exploded perspective view showing a cutter body and a cutting insert of a milling cutter, according to the present invention.
Figure 2:
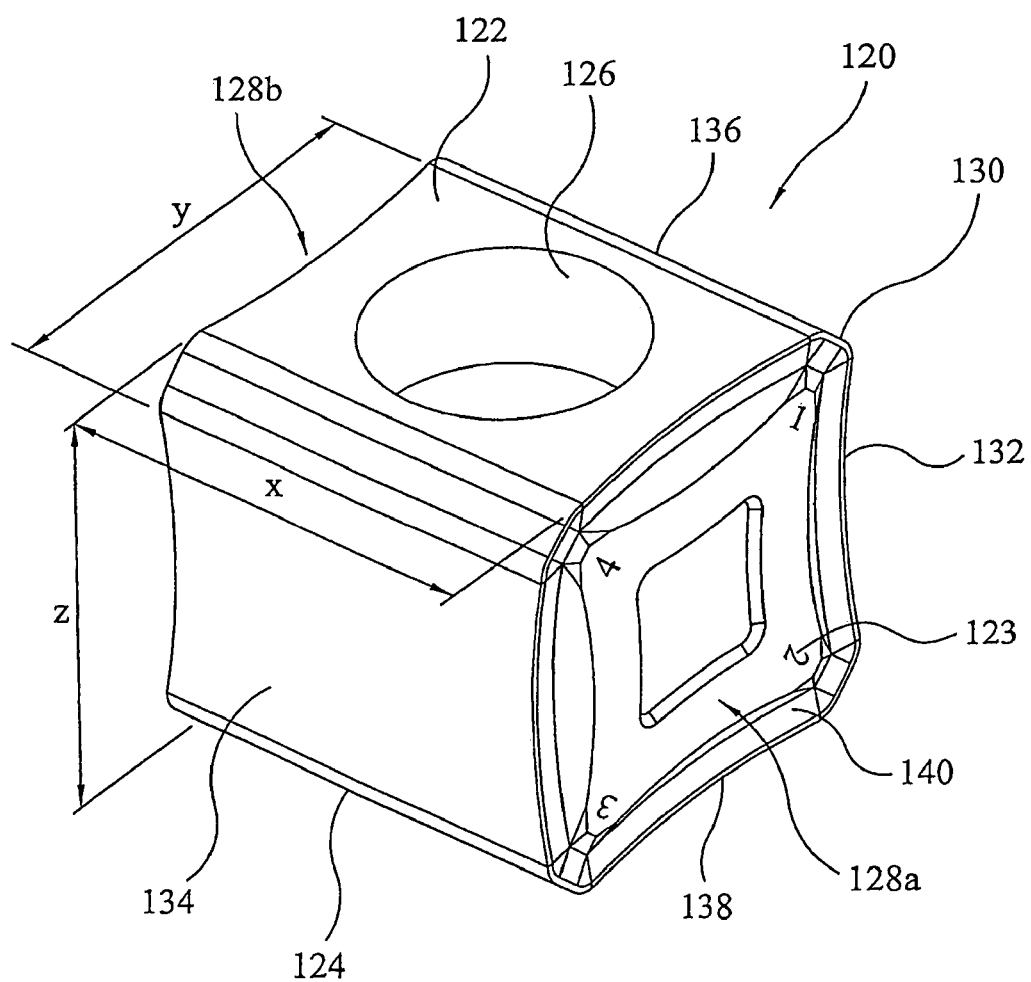
FIG. 2 is a perspective view showing an enlargement of the cutting insert of FIG. 1.

FIG. 1 is an exploded perspective view showing a cutter body and a cutting insert of a milling cutter, according to the present invention. FIG. 2 is a perspective view showing an enlargement of the cutting insert of FIG. 1.

Referring to FIGS. 1 and 2, the milling cutter 100 of the present invention includes a cutter body 110, and a plurality of cutting inserts 120 which are alternately fastened to the cutter body 110 in two directions. In other words, each cutting insert 120 is fastened to the cutter body 110 in either of two directions.

First, the cutter body is mounted to a main shaft (not shown) of a typical machine tool. A plurality of insert seats 112 is radially formed inwards around the circumferential outer surface of the cutter body 110, spaced apart from each other at regular intervals. Each insert seat 112 has first and second locking holes 116a and 116b which are respectively formed on first and second inner surfaces 114a and 114b of the insert seat 112. Each cutting insert 120 is reliably fastened to the insert seat 112 by a locking screw 118 which is tightened into the first or second locking hole 116a or 116b of the insert seat 112 after passing through the cutting insert 120.

Each cutting insert 120 has a cubic or rectangular parallelepiped shape. A through hole 126 is formed in the cutting insert 120 from an upper surface 122 to a lower surface 124 of the cutting insert 120. The cutting insert 120 has first and second cutting blade parts 128a and 128b which have the same shape and are provided on first and second ends of the cutting insert 120, respectively. The locking screw 118 passes through the through hole 126 of each cutting insert 120. Preferably, the width (x), the height (z) and the length (y) of each cutting insert 120 have a ratio from 1:1:0.8 to 1:1:1.2. If the relative length (y) of the cutting insert 120 is less than 0.8, the through hole 126 cannot be formed in the cutting insert 120. As well, even if the through hole 126 is formed in the cutting insert 120, the cutting insert 120 is too weak. If the ratio of the length (y) of the cutting insert 120 is greater than 0.8, raw material costs increase, and a smaller number of cutting inserts 120 must be fastened to the cutter body 110, thus deteriorating cutting efficiency.

Each cutting insert 120 has a rounded corner blade 130 which is provided at each corner of the first and second cutting blade parts 128a and 128b. A main blade 132 is provided between adjacent corner blades 130 to unite the corner blades 130 together. Here, when a workpiece is cut by the milling cutter, one main blade 132 is, first, in contact with the workpiece and machines the workpiece. Each main blade 132 has a smoothly curved outline. That is, the main blades 131 are curved from outer edges of opposite ends of the cutting insert 120 toward central portions of the upper surface 122, the lower surface 124, a first side surface 134 and a second side surface 136 of the cutting insert 120. Each main blade 132 has a flat blade surface 138 and an inclined blade surface 140 which are sequentially provided on the main blade 132 toward a central portion of each of the first and second cutting blade parts 128a and 128b. Preferably, identification marks 123, which consist of consecutive numerals, are formed on the first and second cutting blade parts 128a and 128a at positions adjacent to the corner blades 130, that is, on the opposite ends of the cutting insert 120, by engraving or embossing, so as to distinguish among the corner blades 130. Identification marks 123 comprised of numerals "1" to "4" are provided on the first cutting blade part 128a at positions corresponding to the corner blades 130 of the first cutting blade part 128a. Similarly, identification marks 123 comprised of numerals "5" to "8" are provided on the second cutting blade part 128b at positions corresponding to the corner blades 130 of the first cutting blade part 128b.

The coupling of the cutting inserts 120 to the cutter body 110 of the milling cutter having the above-mentioned structure will be explained herein below briefly.

Figure 3:
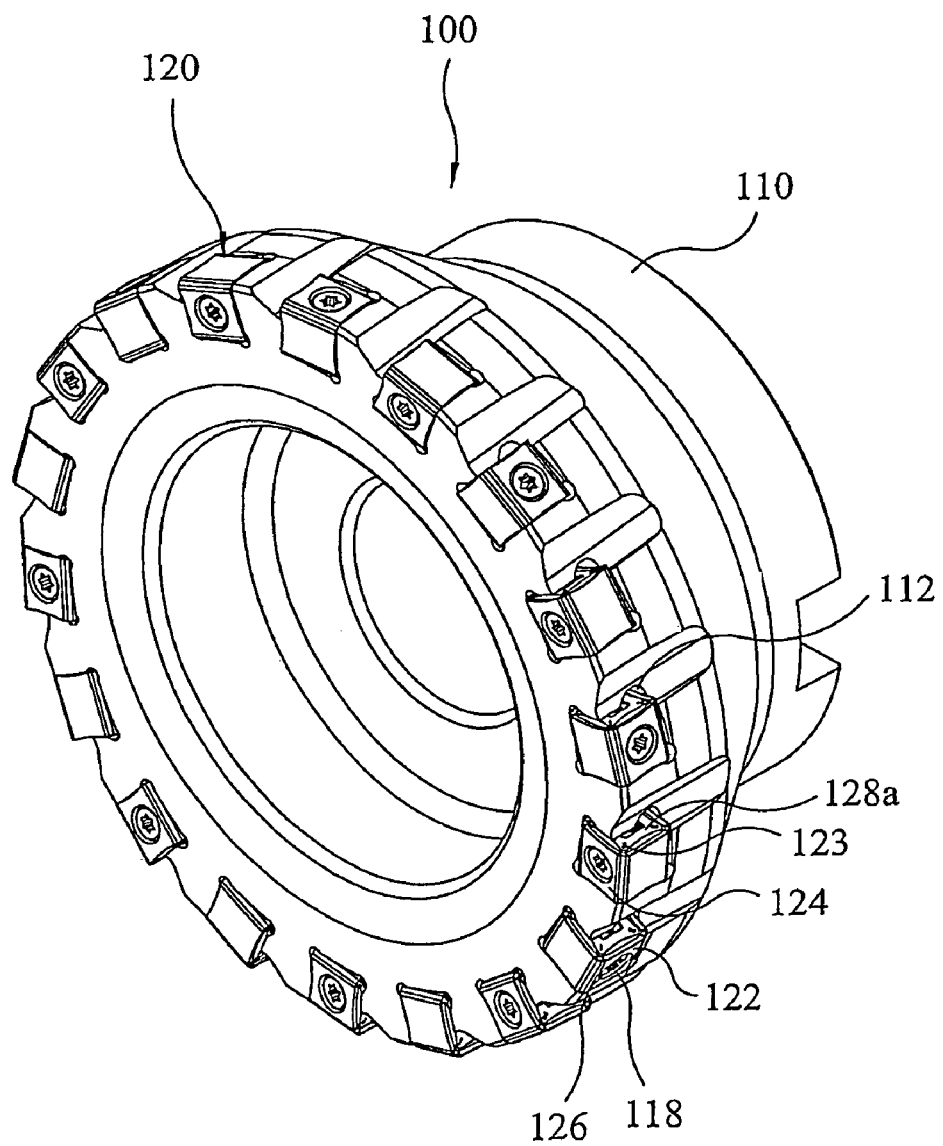
FIG. 3 is a perspective view showing the coupling of the cutting inserts of FIG. 2 to the cutter body of the milling cutter.

FIG. 3 is a perspective view showing the coupling of the cutting inserts of FIG. 2 to the cutter body of the milling cutter.

Referring to FIG. 3, first, to couple the cutting inserts 120 to the cutter body 110, one cutting insert 120 is seated in one insert seat 112 of the cutter body 110 such that an upper surface 122 or lower surface 124 of the cutting insert 120 faces toward a second locking hole 116b of the insert seat 112. In other words, the second inner surface 114b of the insert seat 112 is in contact with the upper surface 122 or lower surface 124 of the cutting insert 120. Then, the second locking hole 116b of the insert seat 112 precisely communicates with the through hole 126 of the cutting insert 120. In this state, a locking screw 118 is tightened into the second locking hole 116a after passing through the lower surface 124 of the cutting insert 120.

As such, after one cutting insert 120 is fastened to one insert seat 112, another cutting insert 120 is seated in an adjacent insert seat 112 such that an upper surface 122 or lower surface 124 of the cutting insert 120 faces toward a first locking hole 116a of the insert seat 112. Then, the first locking hole 116a of the insert seat 112 precisely communicates with the through hole 126 of the cutting insert 120. In this state, another locking screw 118 is tightened into the first locking hole 116a after passing through the lower surface 124 of the cutting insert 120.

In the above-mentioned method, other cutting inserts 120 are sequentially seated in and fastened to the remaining insert seats 112. Then, the cutting insert 120 seated in any insert seat 112 is arranged at an angle of 90° with respect to other cutting inserts 120 seated in adjacent insert seats 112. Therefore, if a user changes the angle at which each cutting insert 120 is seated in the insert seats 112, all corner blades 130 and main blades 132 of the first cutting blade part 128a of each cutting insert 120 can be used for machining workpieces. If all corner blades 130 and main blades 132 of the first cutting blade part 128a become too dull to use them anymore, the user rotates the cutting insert 120 such that the second cutting blade parts 128b of the cutting inserts 120 face the direction to machine a workpiece, and fastens the cutting insert 120 to the associated insert seat 112 in the same method as that described above.

INDUSTRIAL APPLICABILITY

As described above, the present invention provides a milling cutter 100 which includes a cutting insert 120 which has a cubic or rectangular parallelepiped shape and is provided with first and second cutting blade parts 128a and 128b that are respectively formed on first and second ends of the cutting insert. The cutting insert 120 is inserted into a cutter body 110 in either of two directions, so that either an upper surface 122 or a lower surface 124 of the cutting insert, through which a through hole 126 passes, is in contact with the cutter body 110. Therefore, all corner blades 130 and main blades 132 of each of the first and second cutting blade parts 128a and 128b can be used for machining workpieces. Thus, the present invention extends the lifetime of the cutting insert 120 and meets the needs of users.

Furthermore, first and second locking holes 116a and 116b are respectively formed on first and second inner surfaces 114a and 114b of the cutter body 110. Accordingly, the cutting inserts 120, fastened to the cutter body 110, can alternate at an angle of 90°. Thus, the present invention extends the lifetime of the cutting inserts 120.

In addition, an identification mark 123 is formed at a position near each corner blade 130 on the cutting insert 120. This lets a user distinguish whether each corner blade 130 or each main blade 132 has been previously used or not.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A milling cutter, comprising:
  a cutter body configured to be mounted to a main shaft of a cutting tool and including a plurality of insert seats provided around an outer circumference of the cutter body; and
  a plurality of cutting inserts, a corresponding cutting insert having a hexahedral shape and inserted into and selectively fastened to a corresponding insert seat,
  wherein the corresponding cutting insert includes a through hole from an upper surface to a lower surface and the corresponding insert seat includes first and second locking holes arranged on perpendicular surfaces of the corresponding insert seat such that the corresponding cutting insert can be selectively fastened to the corresponding insert seat in either end of each of two perpendicular directions.

2. The milling cutter according to claim 1, wherein the corresponding cutting insert comprises first and second cutting blade parts having the same shape and provided on first and second ends of the corresponding cutting insert.

3. The milling cutter according to claim 1 or 2, wherein the plurality of insert seats are spaced apart from each other at regular intervals.

4. The milling cutter according to claim 2, wherein each of the first and second cutting blade parts comprises:
    a rounded corner blade provided at each of corners of the first and second cutting blade parts; and
    a main blade provided between adjacent corner blades to connect the corner blades to each other.

5. The milling cutter according to claim 4, wherein each of the main blades comprises a flat blade surface and an inclined blade surface which are sequentially provided on the main blade toward a central portion of each of the first and second cutting blade parts.

6. The milling cutter according to claim 1, wherein the cutting insert has a cubic shape.

7. The milling cutter according to claim 1, wherein the cutting insert has a rectangular parallelepiped shape.

8. The milling cutter according to claim 1, wherein a width (x), a height (z) and a length (y) of the cutting insert have a ratio from 1:1:0.8 to 1:1:1.2.

9. The milling cutter according to claim 3, wherein said first locking hole extends radially and said second locking hole extends perpendicular to said first locking hole.

10. The milling cutter according to claim 1, wherein the plurality of inserts seats correspond to cut-out portions of the cutter body.

11. The milling cutter according to claim 10, wherein the plurality of inserts seats correspond to cut-out portions of the cutter body.

* * * * *